July 22, 1924.
A. A. RIBLETT
1,502,268
AUTOMOBILE FENDER BRACE
Filed Aug. 14, 1923
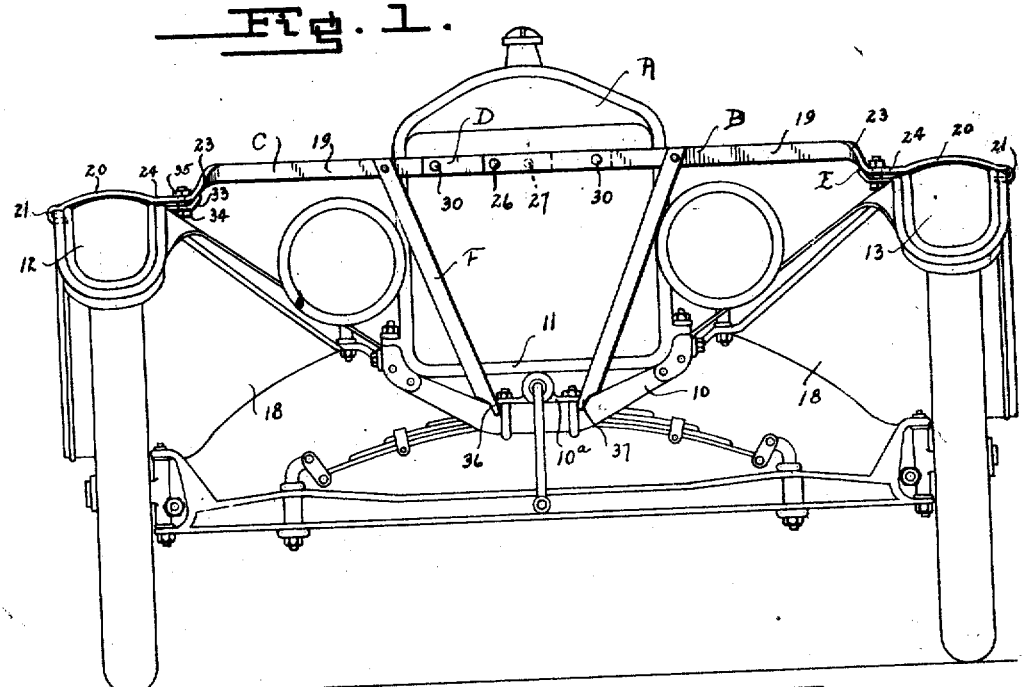
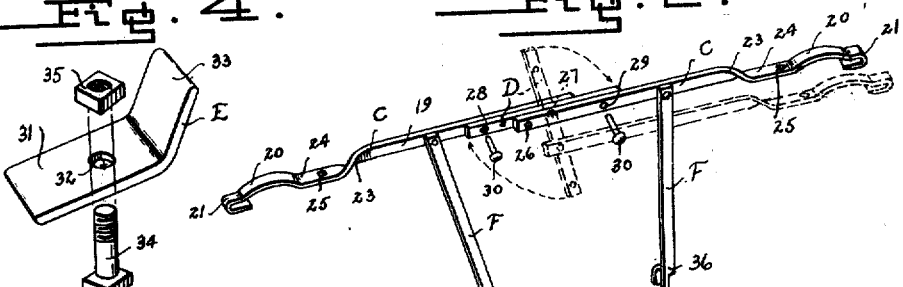
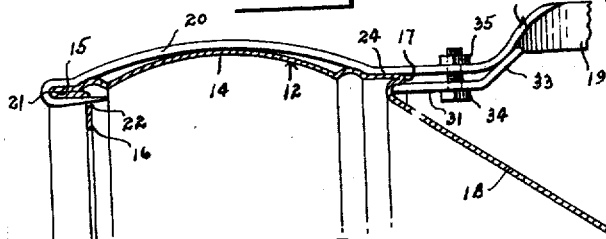
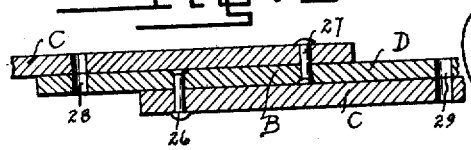
Inventor
Albert A. Riblett Patented July 22, 1924

1,502,268

UNITED STATES PATENT OFFICE.

ALBERT A. RIBLETT, OF BURKBURNETT, TEXAS.

AUTOMOBILE FENDER BRACE.

Application filed August 14, 1923. Serial No. 657,338.

*To all whom it may concern:*

Be it known that I, ALBERT A. RIBLETT, a citizen of the United States, residing at Burkburnett, in the county of Wichita and State of Texas, have invented certain new and useful Improvements in Automobile Fender Braces, of which the following is a specification.

This invention relates to improvements in fender braces and has for its principal objects the provision of bracing constructions which will effectively prevent vibration and sagging of the fenders, incident to the operation of vehicles; to provide bracing constructions which may be detachably secured to the opposite side fenders of vehicles for reinforcing the same, and which are further reinforced by being detachably secured to the vehicle frames; and to provide adjustable bracing constructions which will be easy and simple to install on vehicles without the necessity of mutilating visible parts; and which may quickly be removed therefrom without having marred any portions of the vehicles.

Further objects and advantages will be apparent during the course of the following detailed description.

In the accompanying drawing, forming a part of this specification, and wherein similar reference characters designate corresponding parts throughout the several views:

Figure 1 is a front elevation of a vehicle, showing the improved fender brace as applied to the front fenders thereof and the manner in which the brace is detachably secured to the frame of the vehicle.

Figure 2 is a detail perspective view of the fender brace detached from a vehicle, and showing in dotted lines the manner in which the brace may be elongated for ease of attachment.

Figure 3 is a fragmentary transverse cross sectional view taken through a fender showing a portion of the improved fender brace clamped thereon.

Figure 4 is a fragmentary detail perspective of a supporting element forming a part of the brace.

Figure 5 is a fragmentary perspective view of a clamping member used as a part of this invention.

Figure 6 is a fragmentary cross sectional view showing the manner in which several of the elements may be connected together.

In the drawing, wherein for the purpose of illustration but the preferred embodiment of my invention is shown, the letter A generally designates a vehicle; and B, an improved fender brace construction including a pair of arms C, a connecting link D, clamp member E, and supporting legs F.

The vehicle A may be of any approved type, including a front cross member 10, said member being a part of the chassis or frame of the car and including an element such as an engine support or hanger 10ª secured thereto and intermediate the ends thereof, a radiator 11, and side fenders 12 and 13 on opposite sides of the radiator 11. These fenders 12 and 13 are of ordinary construction, each including the convexly formed guard 14, said guard being provided with an outer marginal flange 15, a web or head 16, and an inner flange 17 from which extends the inclined portion 18 of the fender construction which is attached in the usual manner to the frame or chassis of the vehicle A.

Referring now to the bracing construction B which is adapted to extend transversely of the vehicle A and brace and reinforce the fenders 12 and 13, it includes a pair of arms C each having a bar portion 19, preferably formed of band metal, said arms each being provided at their outer ends with fender engaging portions 20 which are adapted to overlie the top surface of the convex guard portion 14 of the fenders 12 and 13, the extreme outer ends 21 being hook shaped in formation and adapted to extend inwardly and beneath the marginal flange 15. To prevent the brace B from movement longitudinally of the vehicle A, a slot 22 may be provided in each web or head 16 through which the hooked ends 21 may extend and hold the brace B in its proper position. These fender engaging portions 20 are disposed in a substantially horizontal plane, while the bar portions 19 are twisted, as at 23, so as to extend across the front of the radiator 11 in a plane at right angles to the fender engaging portions 20. Intermediate the fender engaging portions 20 and the twisted portions 23 are provided horizontal portions 24 having perforations 25 therein.

The arms C are pivotally connected adjacent the inner ends thereof to the connecting strip or link D by suitable pivotal connections 26 and 27, each arm pivoted independent of the other, the pivotal connections being in spaced apart relation, so that when rotary movement is imparted to the connecting link D, the arms C will be actuated and the hooked ends 21 moved into or out of engagement with the flanges 15 along the marginal edges of the fenders 12 and 13. Adjacent the ends of the link are provided perforations 28 which, when the arms C are in a retracted position will register with corresponding perforations 29 in the arms C, thru which pins 30 may be inserted in order to secure or lock the arms C in a retracted position and prevent rotary movement thereof.

The clamping clips E, preferably made of sheet or band metal, are adapted to be disposed beneath the horizontal portions 24 of the arms C, said clips each comprising a body portion provided with a transverse aperture or perforation 32, the one end of said body portion being upturned or flanged as at 33. These clamping clips E may each be detachably secured beneath the horizontal portions 20 by means of suitable bolt 34 and a nut 35 so that the inner fender flange 17 will be securely clamped between the body portion 31 and the horizontal portion 24, thereby aiding in holding the fenders 12 and 13 in firm position with respect to each other and with respect to the brace construction B. The flange portion 33 of the clip E is adapted to abut the twisted portion 23, of its respective arm C, as is clearly shown in Figure 3 of the drawing, so that when the nut 35 is threaded onto the bolt 34, the body portion 31 will be held spaced from the horizontal portion 24 and a good clamping action effected.

Referring now to the supporting legs F, they preferably are pivotally connected onto the bar portion 19 of each arm C and intermediate the ends thereof. These legs, which may also be formed of band metal, extend downward from the arms C and may be provided at their free ends with inverted U-shaped feet 36, said feet preferably being formed by providing a central longitudinal slit in each of the legs F and bending so as to provide a pair of spaced lugs 37 and a connection 38. When the bracing construction B is adjusted onto a vehicle A, these legs F ordinarily extend from the arms C in converging relation so that the feet 36 engage the cross rail 10 and abut the outer ends of the engine hanger 10ᵃ which will hold them in spaced relation and prevent sliding movement thereof, thereby aiding in supporting and retaining the brace in its proper position.

When it is desired to attach a fender brace construction such as has been described to a vehicle, the connecting link D is swung so as to be in a vertical plane as is illustrated in dotted lines in Figure 2 of the drawings, thereby materially lengthening the arms C as is clearly shown. The legs F are then adjusted so that the feet 36 will engage the cross rail 10 of the vehicle A, the hooked ends 21 of the arms C snapped or inserted under the marginal flanges 16 of the fenders 12 and 13, the clamping clips E bolted or secured in place, and the connecting link D rotated, thereby drawing the fenders toward each other and into their proper position and forcing the feet 36 into clamping engagement with the cross rail 10. When the perforations in the arm D align with the perforations in the arms C, the pins 30 may be inserted which will successfully retain the arms C in extended horizontal position.

From the foregoing description, it is apparent that a fender bracing construction has been provided which is simple and easy to manufacture, and which will effectively hold the side fenders of a vehicle in their proper position, in addition to rendering them more rigid, thereby eliminating practically all vibration and sagging.

Various changes in the shape, size and arrangement of parts may be made to the form of invention herein shown and described, without depart   from the spirit of the same and scope of the claim.

I claim:

A bracing device for the front fenders of an automobile, said bracing device comprising a horizontally disposed brace structure having its outer end portions provided with fender engaging means, and a pair of depending supporting legs connected with the brace structure and each having its lower free end provided with a depending finger for engaging the front face of a permanent portion of the automobile, the lower end of the supporting legs being further provided with a rearwardly extending arm for resting upon the upper face of the permanent portion of the automobile and terminating in a depending finger for engaging the rear face of the said permanent portion of the automobile.

ALBERT A. RIBLETT.